United States Patent [19]

Hartless et al.

[11] B 4,014,853

[45] Mar. 29, 1977

[54] STABILIZED POLYMERIC COMPOSITION AND PRODUCT USING SAME

[75] Inventors: Ray Lawson Hartless, Lopatcong Township, Warren County; Anthony Marion Trozzolo, Murray Hill, both of N.J.

[73] Assignee: Bell Telephone Laboratories, Incorporated, Murray Hill, N.J.

[22] Filed: Aug. 27, 1974

[21] Appl. No.: 500,959

[44] Published under the second Trial Voluntary Protest Program on April 13, 1976 as document No. B 500,959.

[52] U.S. Cl. .............. 260/45.8 NZ; 260/45.9 NC; 260/45.8 A; 428/383
[51] Int. Cl.² ......................................... C08K 5/00
[58] Field of Search ............ 260/45.8 NZ, 45.9 NC; 428/383

[56] References Cited

UNITED STATES PATENTS

| | | | |
|---|---|---|---|
| 3,357,944 | 12/1967 | Dexter | 260/45.9 NC |
| 3,440,210 | 4/1969 | Blount | 260/45.9 NC |

*Primary Examiner*—Donald E. Czaja
*Assistant Examiner*—William E. Parker
*Attorney, Agent, or Firm*—George S. Indig

[57] ABSTRACT

The condensation product of oxalyl dihydrazide and furfural is found to be an effective metal deactivator in saturated hydrocarbon polymers such as polyethylene. The stabilizer is usefully incorporated in primary insulation on copper wire.

7 Claims, No Drawings

STABILIZED POLYMERIC COMPOSITION AND PRODUCT USING SAME

BACKGROUND OF THE INVENTION

1. Field of the Invention

The invention is concerned with the stabilization of essentially saturated hydrocarbon polymeric materials against oxidative degradation and is particularly concerned with such stabilization under circumstances that the polymer is in intimate contact with copper or other metals known to accelerate the oxidative degradative process.

2. Description of the Prior Art

It is well recognized that saturated hydrocarbon polymeric compositions degrade under the influence of oxygen. This degradation which involves mechanical as well as electrical properties increases with increasing temperature and is, accordingly, known as thermal degradation. It is also well known that the degradative process is accelerated by the presence of copper and certain other active metals. The degradative process is believed initiated at the sites of tertiary carbon atoms on the polymer chain and, accordingly, is more pronounced, for example, in polypropylene which, by its nature, contains a tertiary carbon for every two carbons in the main chain, than in polyethylene which may contain only from 1/50 to 1/1000 tertiary carbons expressed as a fraction of the total number of carbon atoms in the polymer chain.

The thermal oxidative degradation process in polyolefins is considered to be autocatalytic, proceeding from the production of free radicals resulting from hydroperoxide production. Catalysis of the degradative process by copper or other metal ions is thought to proceed by the formation of unstable coordination complexes which facilitate free radical production.

Thermal degradative effects are minimized in such compositions generally by any of a class of hindered phenols or aryl amines which combine with free radicals to act as chain terminators. A large variety of such "thermal antioxidants" are commercially available and any of several provide adequate protection for many uses. Nevertheless, there is some continuing effort to develop new antioxidants, sometimes for economic reasons, sometimes to minimize effect on certain polymer properties, and, always, to still further extend lifetime.

An area of some continued activity concerns well engineered, long life expectancy polymeric products which are necessarily maintained in contact with copper or other active metals known to accelerate degradation. Perhaps the most prevalent category is that of primary insulation on copper wire (although similar effects are seen to a lesser extent where copper is replaced by other conductive metals, such as, aluminum). The effect of copper is lessened by any of several metal deactivators which somehow chemically combine with the metal ions. Oxamide, as well as some of its derivatives, accomplishes this end and has been used successfully in polymers including polypropylene and polyethylene. See 5, *Polymer Engineering and Science* 3 (1965). Another class of metal inhibitors is made up of the reaction products of an orthohydroxy aromatic carbonyl compound with an alkyl diamine. A more recently developed class of compounds, now in prevalent use in polyethylene, includes the reaction product of benzaldehyde and oxalyl dihydrazide. Such compounds, as represented by N,N'-dibenzal (oxalyl dihydrazide), are now in widespread use in polyethylene and ethylene propylene primary insulation. See U.S. Pat. No. 3,440,210. In general, where particularly long life is required, such protected compositions contain both a metal deactivator and a conventional thermal antioxidant.

SUMMARY OF THE INVENTION

Members of a new class of compounds effectively stabilize polyolefin compositions such as polyethylene, polypropylene, polybutene-1 and generally homo and copolymers which may be regarded as essentially saturated hydrocarbon materials. Stabilization continues to be effective where the polymer is in intimate contact with copper or other metal known to accelerate oxidation degradation. The class consists of condensation products of oxalyl dihydrazide together with a furyl aldehyde or ketone. A preferred member of this class:

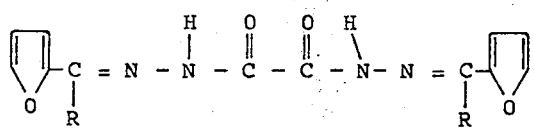

in which R is hydrogen or an alkyl substituent is reasonably representative. A primary advantage over the best known metal deactivators is economic, the five-membered ring reactant being readily available as a product of the acid hydrolysis of oat hulls, corn cobs, etc. Stabilizers of the invention contain the functional group of oxamide (see 5, *Polymer Engineering and Science*, 3 (1965)). There are also chemically related to N,N' dibenzal (oxalyl dihydrazide), a commercial metal deactivator now in prevalent use, particularly in polyethylene composition (see U.S. Pat. No. 3,440,210). Accelerated test data as described under the Detailed Description indicates the inventive compounds are somewhat more effective than both of these prior art materials as metal deactivators.

The inventive compounds, while somewhat effective as composite thermal antioxidant metal deactivators, are inadequate for most discriminating use and it is contemplated that well-engineered compositions will include a thermal antioxidant stabilizer in addition to a furyl derivative.

DETAILED DESCRIPTION

1. Composition

A. Novel Stabilizer

Compositions of the invention are exemplified by the compound:

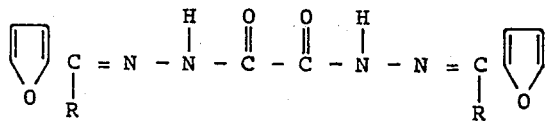

Experiments to date show a preference for the condensation products produced from furfural, i.e., that in which R is hydrogen. This preference is based largely on ease of preparation. Yield apparently decreases markedly for furyl ketones as well as for other 5-ring reactants containing substituents.

Still from the preparatory standpoint oxalyl dihydrazide is certainly preferred. Other compounds containing the oxamide grouping retain the effectiveness of the prototype material but are difficult to prepare.

b. The Polymer

Polymeric compositions beneficially stabilized in accordance with the invention are nominally ethylenically saturated. They may be homopolymers, such as, polyethylene, polypropylene, poly-butene-1 etc; they may be copolymers, such as, poly (ethylene-propylene). From the thermal oxidative standpoint, it is now well established that a region of susceptibility in the polymer is that containing a tertiary carbon atom. First attack may also involve an occasional (nominally absent) ethylenic unsaturation as well as certain impurities, such as, residual catalyst originally introduced to bring about polymerization (particularly in high density Ziegler-type polymers).

While discussion is generally in terms of prototypical polyolefins, whether homopolymers or copolymers, in fact, commercial products are generally somewhat more complex and may contain up to 10 percent by weight of other, generally hydrocarbon constituents, as part of the polymers or in a mixture exclusive of filler. Commercial examples of such products, all adequately protected in accordance with the invention, are the polymerization products of monomers, such as, ethylene or propylene together with vinyl acetate, acrylic acid, methacrylic acid, and/or esters of acrylic acids.

C. Other Ingredients

A variety of other ingredients are conventionally included in commercial polymeric products of the type contemplated. These include lubricants, fillers, pigments, and other colorants, etc. Under certain circumstances, pigmentation may be designed to afford protection from ultraviolet attack although, in general, stabilizers of the invention are contemplated primarily for use in primary insulation which, in most structures, is protected from ultraviolet attack by outer sheathing.

D. Other Considerations

It has been noted that the furyl derivatives of the invention are at least comparable with the best prior art materials as metal deactivators in polyolefin compositions. A direct comparison under one set of test conditions is set forth in Table I. The most significant improvement is seen from the data resulting from many days of oven exposure at 70° C prior to the 140° C oven uptake test. Table II indicates that while effectiveness is substantial for polyolefin primary insulation containing only a furyl derivative, expectancy may be inadequate for long life applications. It is contemplated that well engineered polymer compositions will include a thermal antioxidant in addition to a furyl derivative stabilizer. While a variety of thermal antioxidants may be incorporated, commercially available hindered phenols of the non-staining variety are likely preferred in usual color coded multiconductor structures. The hindered phenol antioxidant included in the compositions of Table I is particularly effective. Its structural formula is

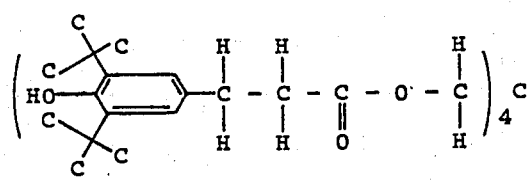

A new antioxidant which, according to preliminary test data, is of still greater effectiveness is described and claimed in copending application Ser. No. 500,957, filed Aug. 27, 1974 (Hartless-Trozzolo Case 1-5).

A variety of polymer modifiers are known and many are in use in commercially available products. These include butadiene, butyl rubber (included to improve low temperature properties) as well as other modifiers set forth in section B above. Such modifiers are sometimes included as part of the polymer, sometimes as admixtures. Modifiers are generally included in amounts of less than 10 percent by weight based on the total polymer composition.

The most probable contemplated use of the inventive compositions is as primary insulation. Color coding in such use in common, and pigments or dyestuffs may be added for this purpose. All such additives including stabilizer materials are generally within the range of 0.01 to 5.0 percent and preferably from 0.05 to 0.5 percent, all expressed as a weight percentage of the total polymeric composition exclusive of filler. Filler materials are generally included to reduce cost. Since usual fillers such as silica may impair mechanical as well as electrical properties, ultimate use may suggest maximum permissible inclusion. Substantial amounts of filler material are insoluble in many polyolefins and, so, for example, only very small amounts may be contained in uncross-linked homopolymers of ethylene.

2. Test Procedure

Compositions were synthesized by condensing one mole of oxalyl dihydrazide with 2 moles of the appropriate carbonyl compound in a solvent (e.g., ethanol or dimethyl sulfoxide). This is a conventional condensation reaction well understood by workers in the field. Appropriate conditions are evident from standard references such, for example as J. March, *Advanced Organic Chemistry*, McGraw-Hill, New York, 1958.

Accelerated test procedures utilized to determine effectiveness have been in prevalent use for many years. They generally take the form of oxygen uptake measurement with the polymeric composition at some elevated temperature. For polyethylene compositions chosen as the subject of the examples, uptake measurements were conducted at 140° C. Test procedures are adequately described in the literature. See, for example, W. L. Hawkins, *Polymer Stabilization*, Wiley, New York, 1972, Chapter 10. Briefly, samples of measured volume are placed in a tube attached to a mercury manometer together with a measured quantity of absorbant material. Tube and associated apparatus are evacuated, flushed with, and finally filled with, oxygen and are brought to temperature in an appropriate furnace. Tube and contents are next connected to an oxygen gas burette; the system is adjusted to zero reading at atmospheric pressure, and readings of oxygen uptake are measured as a difference in column heights. Readings are taken at appropriate intervals, generally several hours apart.

The form of the resultant data is that of the conventional hindered phenol-stabilized system. This is characterized by an initial period known as the induction period in which oxygen uptake is extremely low. The induction period terminates with a sharp increase in slope of oxygen uptake vs. time.

Two forms of tests were conducted. In the first, effectiveness primarily as a metal deactivator was measured;

in the second, performance as a composite thermal antioxidant-metal deactivator was evaluated. For comparison purposes, all tests were conducted on a commercial polyethylene composition.

Samples for the first series of tests were prepared by extruding unstabilized polyethylene with 0.1 percent by weight of the inventive stabilizer together with 0.1 percent of a hindered phenolic thermal stabilizer (0.1 percent tetrakis-3-(3,5-di-t-butyl-4-hydroxyphenyl) propionatemethyl methane on 22 gauge copper wire. Insulation thickness in each instance was 6–7 mils. Gross sample weight was approximately 1 gram with about 0.108 gram being contributed by the insulation.

In the second series of tests, precisely the same procedure was followed as in the first series except that the hindered phenolic thermal stabilizer was omitted.

The termination of the induction period was set at 1.0 milliliter of oxygen uptake for the 0.1 gram polymer sample. Choice of this particular level is meaningful from the standpoint of mechanical and electrical properties.

3. Examples

Examples are set forth in tabular form with Tables I and II showing effectiveness as Copper deactivators alone and as composite metal deactivator-thermal antioxidant respectively. Each table includes a "standard" which corresponds with the same polymeric composition, however without a furyl derivative stabilizer. The standard of Table I includes the same amount of the same prior art hindered phenolic antioxidant as to the numbered examples. The standard of Table II is unstabilized polyethylene.

Examples 1–6 of Table I differ only with respect to thermal history prior to oxygen uptake testing. Thermal history is in terms of days of exposure at 70° C. Complex test data developed in this fashion is considered quite meaningful. Data of this form has been found to serve as a reliable basis for extrapolation to life under expected operating conditions. It is of particular interest that the furyl derivative stabilizer chosen for the examples is somewhat less effective than the commercial stabilizer as tested without preliminary heating but that retained effectiveness is far greater after some days of exposure at 70° C. This improved retained effectiveness may be ascribed to decreased mobility.

The data of Table II shows that some protection is retained where the furyl derivative is the only included stabilizer. Since however the 16 hours under the accelerated conditions noted is inadequate for many purposes it is contemplated that well engineered compositions will additionally include a separate thermal antioxidant.

Table I

Effectiveness as Metal Deactivator

| Example | Conventional Antioxidant | Oven Exposure at 70°C - Days | Induction Period at 140°C - Hours | |
| --- | --- | --- | --- | --- |
| | | | Metal Deactivator A* | Metal Deactivator B** |

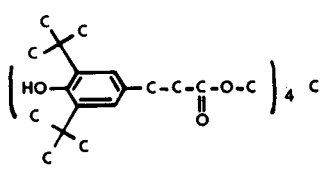

| 1 | (structure) | 0 | 130 | 153 |
| 2 | " | 15 | 118 | |
| 3 | " | 30 | 107 | |
| 4 | " | 45 | 96 | 80 |
| 5 | " | 60 | 96 | |
| 6 | " | 100 | 78 | 48 |

Note: A standard with the same conventional antioxidant but with no metal deactivator had an induction period of less than five hours with no 70°C exposure.

*A  (Inventive Stabilizer)

**B  (Commercially available stabilizer)

TABLE II

Effectivenss as Composite Metal Deactivator-Thermal Antioxidant

| Example | Inventive Stabilizer | Induction Period at 140° C-Hours |
| --- | --- | --- |
| 7 | 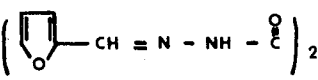 | 16 |
| Standard | NONE | 4.5 |

What is claimed is:

1. Article including at least one metallic portion in intimate contact with a plastic portion, said metallic portion including at least one element which accelerates the oxidative degradation of at least a component of the said plastic portion, the said plastic portion including a polymeric composition which is at least 90 percent by weight polymer, exclusive of filler, the said plastic portion containing a metal deactivator to lessen the acceleration of oxidative degradation due to the said metallic portion; characterized in that the said metal deactivator may be produced as the condensation product of two reactants: oxalyl dihydrazide and a furyl carbonyl compound selected from the group consisting of substituted and unsubstituted furyl aldehydes and furyl ketones.

2. Article of claim 1 in which the said metal deactivator is the condensation product of unsubstituted 2-hydroxy phenyl ketone and is contained within the range of from 0.01 percent to 5.0 percent by weight based on the polymeric composition.

3. Article of claim 2 in which the said polymer may be produced by the polymerization of ethylene.

4. Article of claim 1 in which the said metallic portion comprises copper.

5. Article of claim 1 in which the said plastic portion contains a thermal antioxidant in addition to the metal deactivator.

6. Article of claim 5 in which the said thermal antioxidant is a hindered phenol.

7. Article of claim 1 in which the said metal deactivator is of the structure

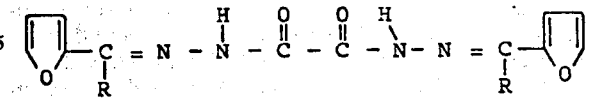

in which R is hydrogen or an alkyl substituent.

UNITED STATES PATENT OFFICE
CERTIFICATE OF CORRECTION

Patent No. 4,014,853          Dated March 29, 1977

Inventor(s) Ray L. Hartless, et al

It is certified that error appears in the above-identified patent and that said Letters Patent are hereby corrected as shown below:

Column 2, line 35, "There" should read --They--.
         line 36, delete "dibenzyl" and insert --dibenzal--.

Signed and Sealed this

Thirty-first Day of October 1978

[SEAL]

Attest:

RUTH C. MASON
Attesting Officer

DONALD W. BANNER
Commissioner of Patents and Trademarks